(12) United States Patent
Yeh et al.

(10) Patent No.: US 9,804,352 B2
(45) Date of Patent: Oct. 31, 2017

(54) COAXIAL TRANSMITTER OPTICAL SUBASSEMBLY (TOSA) WITH AN OPTICAL FIBER COUPLING RECEPTACLE

(71) Applicant: Applied Optoelectronics, Inc., Sugar Land, TX (US)

(72) Inventors: Che-Shou Yeh, New Taipei (TW); Jianhong Luo, Ningbo (CN); Li-Chieh Su, New Taipei (TW); Weihao Sun, Ningbo (CN); Hua Liu, Ningbo (CN)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/073,322

(22) Filed: Mar. 17, 2016

(65) Prior Publication Data
US 2017/0269315 A1  Sep. 21, 2017

(51) Int. Cl.
| | | |
|---|---|---|
| *G02B 6/36* | (2006.01) | |
| *G02B 6/42* | (2006.01) | |
| *G02B 6/38* | (2006.01) | |
| *G02B 6/12* | (2006.01) | |
| *G02B 6/293* | (2006.01) | |

(52) U.S. Cl.
CPC ....... *G02B 6/4292* (2013.01); *G02B 6/12019* (2013.01); *G02B 6/2938* (2013.01); *G02B 6/3877* (2013.01); *G02B 6/421* (2013.01); *G02B 6/4208* (2013.01); *G02B 6/4263* (2013.01); *G02B 6/4274* (2013.01)

(58) Field of Classification Search
CPC .................................................... G02B 6/4292
See application file for complete search history.

(56) References Cited

U.S. PATENT DOCUMENTS

| | | | | |
|---|---|---|---|---|
| 2009/0116838 | A1* | 5/2009 | Kihara | G02B 6/4208 398/79 |
| 2014/0355997 | A1* | 12/2014 | Miao | H04B 10/40 398/135 |
| 2015/0192746 | A1* | 7/2015 | Chan | G02B 6/4292 385/88 |
| 2015/0378107 | A1* | 12/2015 | Akashi | G02B 6/421 398/139 |
| 2016/0319351 | A1* | 11/2016 | Gudbjartsson | C12Q 1/6883 |

OTHER PUBLICATIONS

PCT Search Report and Written Opinion dated Apr. 14, 2017, received in corresponding PCT Application No. PCT/US17/22908, 12 pgs.

\* cited by examiner

*Primary Examiner* — Sung Pak
(74) *Attorney, Agent, or Firm* — Grossman Tucker Perreault & Pfleger, PLLC; Norman S. Kinsella (57) ABSTRACT

A coaxial transmitter optical subassembly (TOSA) including an optical fiber coupling receptacle coupled to a laser package may be used in an optical transceiver for transmitting an optical signal at a channel wavelength. The optical fiber coupling receptacle may include a housing having a first open end to receive a ferrule-terminated optical fiber. The receptacle may also include a fiber-coupling ferrule holding an optical fiber segment and secured within the housing to optically couple the optical fiber segment to a laser of the TOSA through a second open end of the housing opposite the first open end. The receptacle may further include a sleeve disposed on an interior surface of the housing to provide a cavity to secure the ferrule-terminated optical fiber and align the optical fiber to the optical fiber segment.

20 Claims, 9 Drawing Sheets

COAXIAL TRANSMITTER OPTICAL SUBASSEMBLY (TOSA) WITH AN OPTICAL FIBER COUPLING RECEPTACLE

TECHNICAL FIELD

The present disclosure relates to optical transmitters and transceivers and more particularly, to a coaxial transmitter optical subassembly (TOSA) with an optical fiber coupling receptacle for use in an optical transceiver.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield.

Optical transceiver modules generally include one or more laser packages for housing a laser or laser diode and for providing electrical connections and optical couplings to the laser. One challenge with an optical transceiver module assembly is the process of bonding the optical fiber to the laser package with a relatively high degree of precision to reduce signal losses that may result from misalignment or other coupling problems. Assembly difficulties may increase as the number of laser packages that are incorporated into an optical transceiver increase, since each laser package will generally require a separate fiber optic bonding connection.

BRIEF DESCRIPTION OF THE DRAWINGS

These and other features and advantages will be better understood by reading the following detailed description, taken together with the drawings wherein.

DETAILED DESCRIPTION

A coaxial transmitter optical subassembly (TOSA) including an optical fiber coupling receptacle, consistent with embodiments of the present disclosure, may be used in an optical transceiver for transmitting an optical signal at a channel wavelength. The optical fiber coupling receptacle allows for insertion of a ferrule-terminated optical fiber into the receptacle which is configured to provide coupling of the optical fiber to a laser package in a relatively efficient manner with reduced assembly time and cost, and improved yield. An optical transceiver may include multiple coaxial TOSAs, with optical fiber coupling receptacles, stacked in the transceiver housing.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Figure 1A:
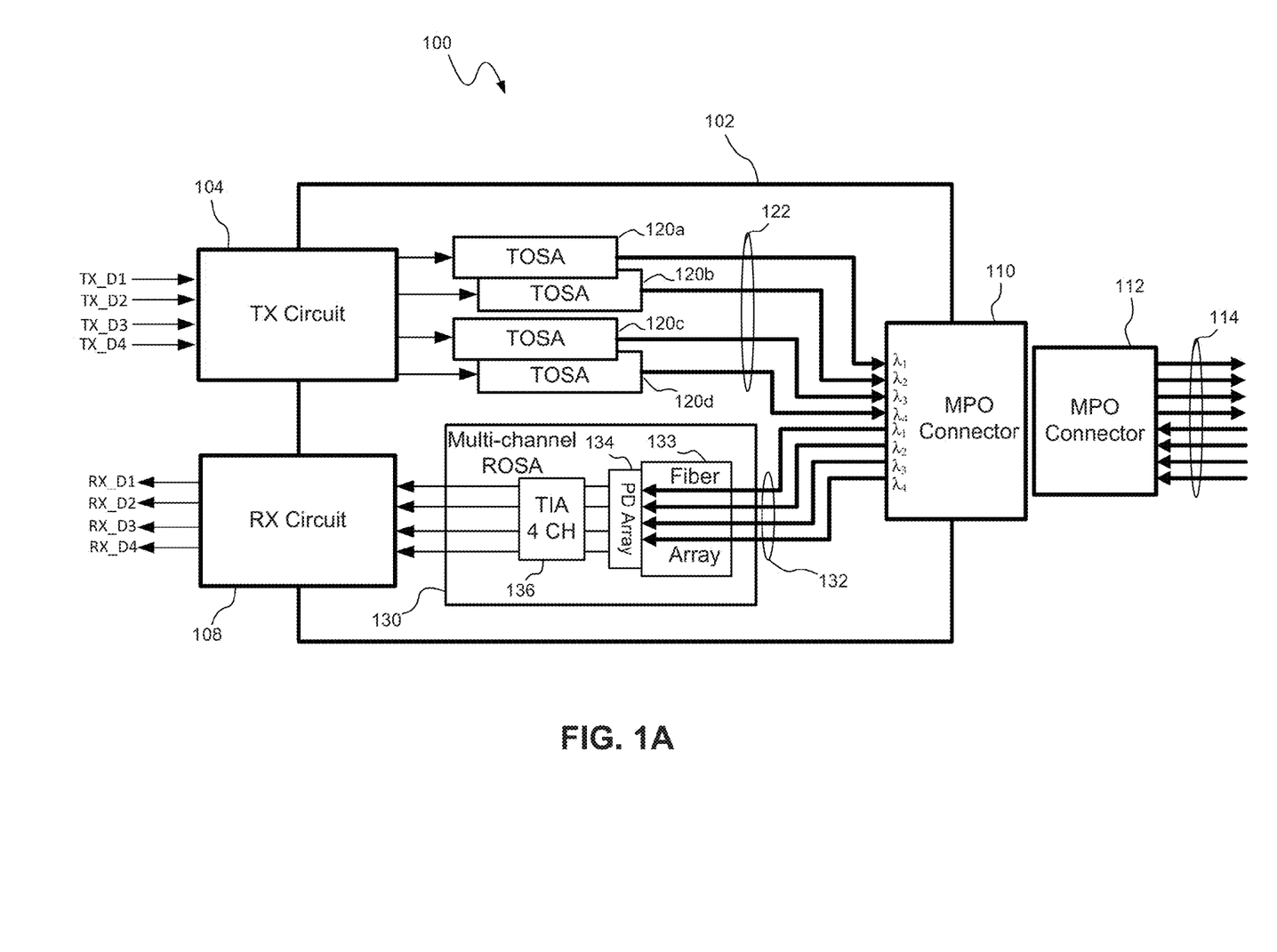
FIGS. 1A and 1B are functional block diagrams of multiple channel optical transceivers, consistent with embodiments of the present disclosure.

Referring to FIG. 1A, an optical transceiver 100, consistent with embodiments of the present disclosure, is shown and described. In this embodiment, the optical transceiver 100 transmits and receives four (4) channels using four different channel wavelengths ($\lambda_1$, $\lambda_2$, $\lambda_3$, $\lambda_4$) and may be capable of transmission rates of at least about 10 Gbps per channel. In one example, the channel wavelengths $\lambda_1$, $\lambda_2$, $\lambda_3$, $\lambda_4$ may be 1270 nm, 1290 nm, 1310 nm, and 1330 nm, respectively. The optical transceiver 100 may also be capable of transmission distances of 2 km to at least about 10 km. The optical transceiver 100 may be used, for example, in internet data center applications or fiber to the home (FTTH) applications.

This embodiment of the optical transceiver 100 includes multiple transmitter optical subassemblies (TOSAs) 120a-d for transmitting optical signals on different channel wavelengths and a multi-channel receiver optical subassembly (ROSA) 130 for receiving optical signals on different channel wavelengths. The TOSAs 120a-d and the multi-channel ROSA 130 are located in a transceiver housing 102. A transmit connecting circuit 104 and a receive connecting circuit 108 provide electrical connections to the TOSAs 120a-d and the multi-channel ROSA 130, respectively, within the housing 102. The transmit connecting circuit 104 is electrically connected to the electronic components (e.g., the laser, monitor photodiode, etc.) in each of the TOSAs 120a-d and the receive connecting circuit 108 is electrically connected to the electronic components (e.g., the photodiodes, the TIA, etc.) in the multi-channel ROSA 130. The transmit connecting circuit 104 and the receive connecting circuit 108 include at least conductive paths to provide electrical connections and may also include additional circuitry.

A multi-fiber push on (MPO) connector 110 provides optical connections to the TOSAs 120a-d and the multi-channel ROSA 130 within the housing 102. The MPO connector 110 is optically coupled to the TOSAs 120a-d and the multi-channel ROSA 130 via transmit optical fibers 122 and receive optical fibers 132, respectively. The MPO connector 110 is configured to be coupled to a mating MPO connector 112 such that the optical fibers 122, 132 in the optical transceiver 100 are optically coupled to external optical fibers 114.

Each of the TOSAs 120a-d may be a coaxial TOSA with a coaxial configuration electrically connected at one end to conductive paths on the transmit connecting circuit 104 and optically coupled at the other end to a respective one of the optical fibers 122. Each of the TOSAs 120a-d may include a laser for generating laser light at the assigned channel wavelength and optics for coupling the laser light into the respective optical fiber 122. The lasers in the TOSAs 120a-d thus convert electrical data signals (TX_D1 to TX_D4) received via the transmit connecting circuit 104 into modulated optical signals transmitted over transmit optical fibers 122. The lasers may include, for example, distributed feedback (DFB) lasers with diffraction gratings. Each of the TOSAs 120a-d may also include a monitor photodiode for monitoring the light emitted by the lasers. Each of the TOSAs 120a-d may further include one or more temperature control devices, such as a resistive heater and/or a thermoelectric cooler (TEC), for controlling a temperature of the lasers, for example, to control or stabilize the laser wavelengths.

The multi-channel ROSA 130 includes a photodetector array 134 including, for example, photodiodes optically coupled to a fiber array 133 formed by the ends of the receive optical fibers 132. The multi-channel ROSA 130 also includes a multi-channel transimpedance amplifier 136 electrically connected to the photodetector array 134. The photodetector array 134 and the transimpedance amplifier 136 detect and convert optical signals received from the fiber array 133 into electrical data signals (RX_D1 to RX_D4) that are output via the receive connecting circuit 108.

This embodiment of the optical transceiver 100 does not include an optical multiplexer or demultiplexer. The optical signals may be multiplexed and demultiplexed external to the optical transceiver 100.

Figure 1B:
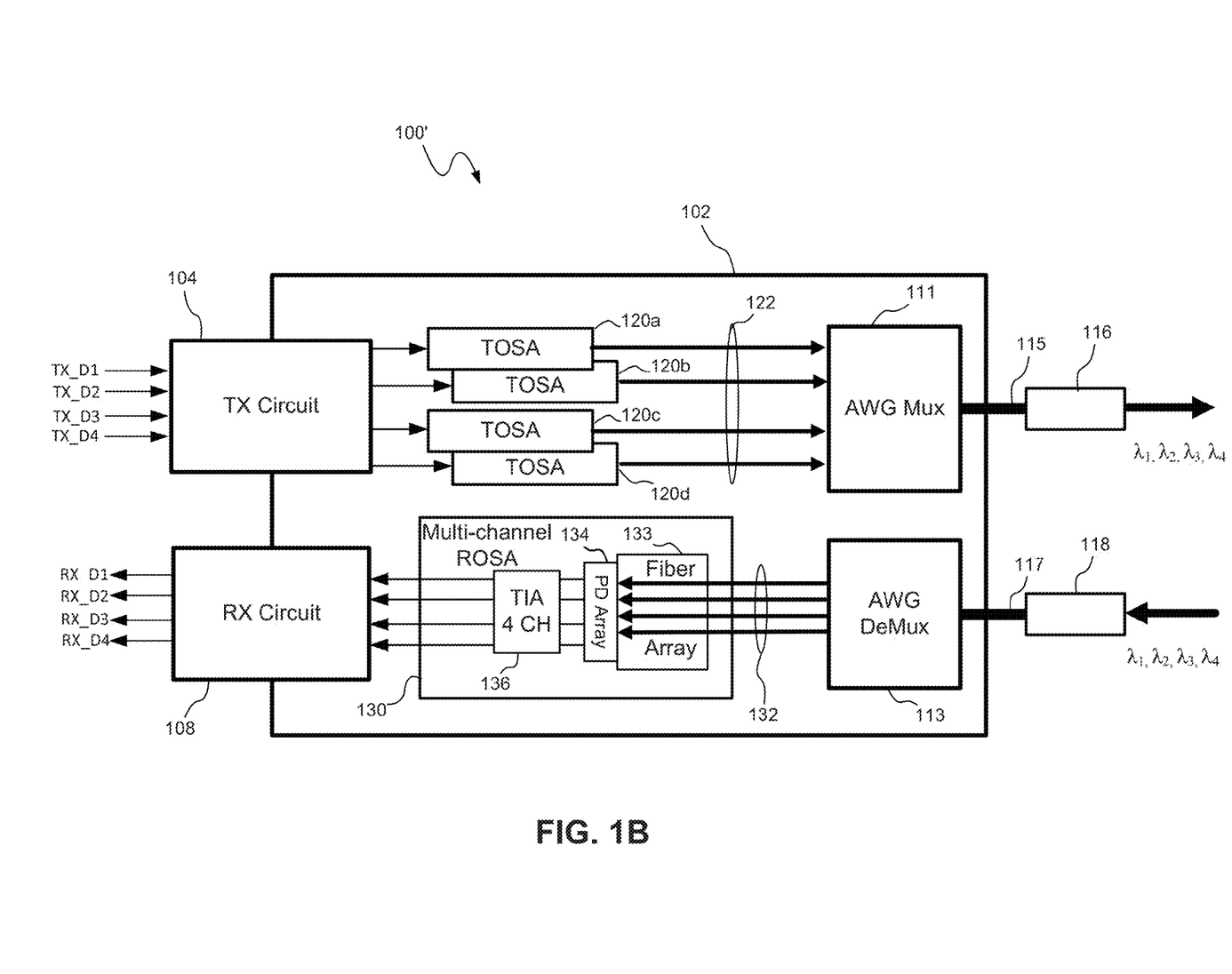

Referring to FIG. 1B, another embodiment of an optical transceiver 100' includes the same light engine (e.g., TOSAs 120a-d and ROSA 130) described above together with an optical multiplexer 111 and an optical demultiplexer 113. The optical multiplexer 111 and the optical demultiplexer 113 both may include arrayed waveguide gratings (AWGs). The optical multiplexer 111 is optically coupled to the transmit optical fibers 122 and the optical demultiplexer 113 is optically coupled to the receive optical fibers 132. The optical multiplexer 111 multiplexes the optical signals being transmitted over transmit optical fibers 122 to provide a multiplexed optical signal on an output optical fiber 115. The optical demultiplexer 113 demultiplexes a multiplexed optical signal received on an input optical fiber 117 to provide received optical signals on receive optical fibers 132. The output optical fiber 115 and the input optical fiber 117 are coupled to an output optical connector 116 and an input optical connector 118, respectively.

This embodiment of the optical transceiver 100' includes 4 channels and may be configured for coarse wavelength division multiplexing (CWDM), although other numbers of channels are possible. This embodiment of the optical transceiver 100' may also be capable of transmission rates of at least about 10 Gbps per channel and transmission distances of 2 km to at least about 10 km and may be used in internet data center applications or fiber to the home (FTTH) applications.

Figure 2:
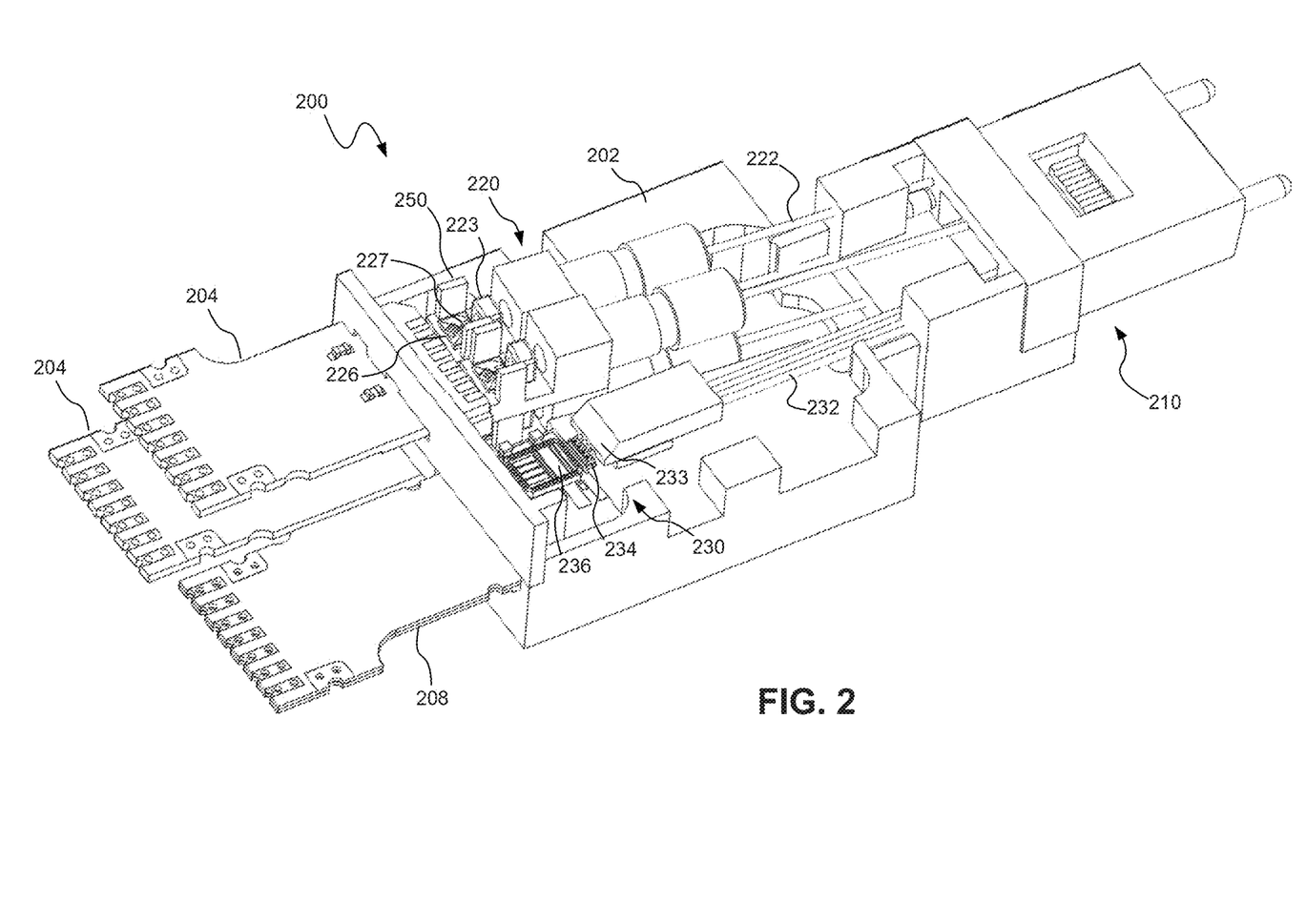
FIG. 2 is a perspective view of an embodiment of an optical transceiver module including coaxial TOSAs with optical fiber coupling receptacles.

Referring to FIG. 2, an embodiment of an optical transceiver module 200 with an MPO connector 210 is described and shown in greater detail. The optical transceiver module 200 may be designed to have a relatively small form factor with minimal space. The optical transceiver module 200 includes a transceiver housing 202, four coaxial TOSAs 220 stacked together in one region of the housing 202, and a multi-channel ROSA 230 located in another region of the housing 202. The coaxial TOSAs 220 are electrically connected to transmit flexible printed circuits (FPCs) 204 at one end of the housing 202 and optically coupled to the MPO connector 210 at the other end of the housing 202 via transmit optical fibers 222. The multi-channel ROSA 230 is electrically connected to a receive flexible printed circuit (FPC) 208 at one end of the housing 202 and optically coupled to the MPO connector 210 at the other end of the housing 202 via receive optical fibers 232.

Each of the coaxial TOSAs 220 includes a laser package 250 that contains a laser submount 226, a diode laser 227 on the submount 226, and a lens 223. The laser submount 226 electrically connects the diode laser 227 to the respective transmit FPC 204, for example, using wire bonding. The lens 223 optically couples the laser 227 to the respective transmit optical fiber 222. Each of the coaxial TOSAs 220 has a coaxial configuration such that electrical connections are made from one end of the TOSA 220 and an optical coupling is made from the other end of the TOSA 220. In some embodiments, the laser package may be a cuboid type transistor outline (TO) package, as described in greater detail in U.S. patent application Ser. No. 14/720,336, titled "Coaxial Transmitter Optical Subassembly (TOSA) with Cuboid Type TO Laser package and Optical Transceiver Including Same," which is fully incorporated herein by reference. As used herein, "cuboid type TO package" refers to a laser package structure having a generally cuboid or parallelepiped outer shape formed by at least three substantially flat and orthogonal outer surfaces.

The multi-channel ROSA 230 includes a fiber array 233 optically coupled to a photodetector array 234 and a transimpedance amplifier (TIA) 236 electrically connected to the photodetector array 234. The end faces of the optical fibers 232 in the fiber array 233 may be angled (e.g., at 45°) such that the light is reflected from the angled face to couple with the respective photodiodes in the photodetector array 234. The TIA 236 is electrically connected to the receive FPC 208, for example, using wire bonding.

Figure 3A:
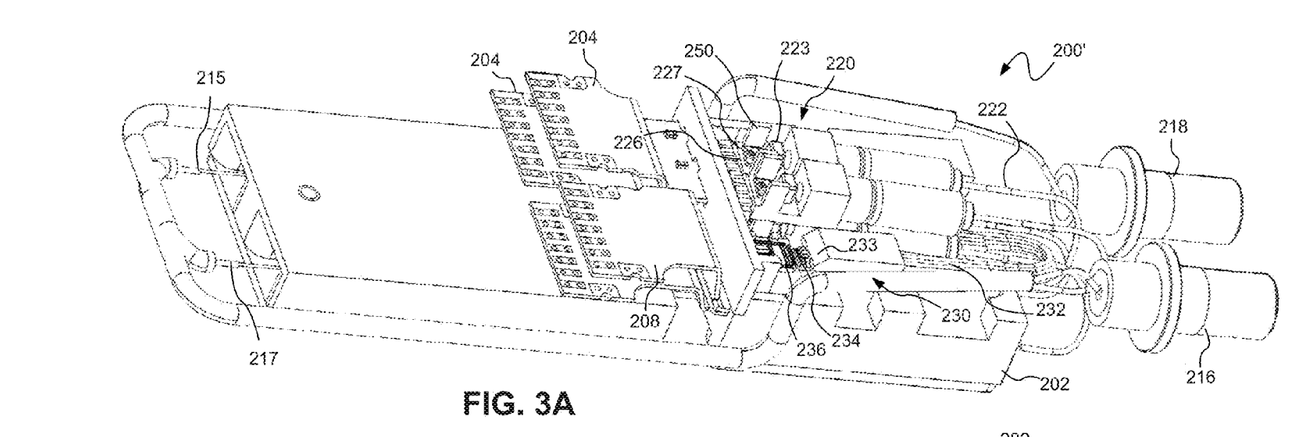
FIGS. 3A and 3B are top and bottom perspective views, respectively, of another embodiment of an optical transceiver module including coaxial TOSAs with optical fiber coupling receptacles.
Figure 3B:
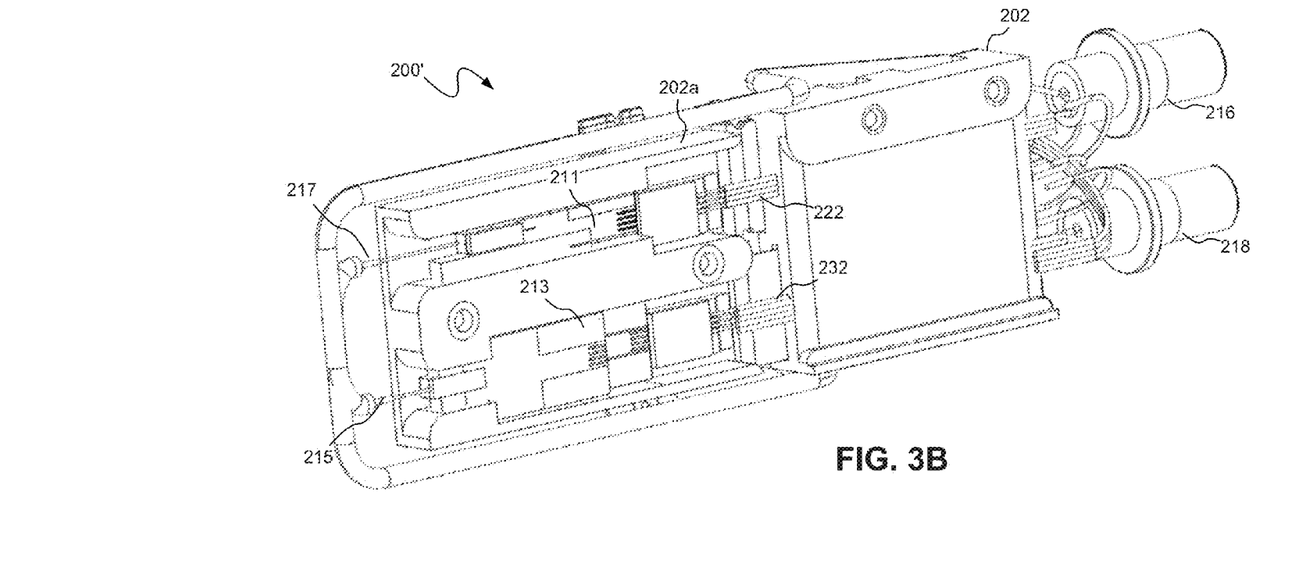

Referring to FIGS. 3A and 3B, another embodiment of an optical transceiver module 200' including an optical multiplexer and an optical demultiplexer is shown in greater detail. The optical transceiver module 200' includes the coaxial TOSAs 220, the multi-channel ROSA 230, and the FPCs 204, 208, as described above. This embodiment of the optical transceiver module 200' further includes an AWG housing portion 202a that contains a multiplexing AWG 211 and a demultiplexing AWG 213. The AWG housing portion 202a may be coupled to and/or extend from the transceiver housing 202. The multiplexing AWG 211 is optically coupled to the coaxial TOSAs 220 via transmit optical fibers 222 and the demultiplexing AWG 213 is optically coupled to the ROSA 230 via the receive optical fibers 232. The multiplexing AWG 211 and the demultiplexing AWG 213 are optically coupled to output optical connector 216 and input optical connector 218, respectively, via output optical fiber 215 and input optical fiber 217, respectively.

These embodiments of the optical transceiver module 200, 200' may both include coaxial TOSAs 220 with optical fiber coupling receptacles and laser packages, as will be described in greater detail below. The coaxial TOSA 220 with the optical fiber coupling receptacle and laser package may also be used in other types of optical transceivers such as the multi-channel transceiver used in an optical line terminal (OLT), as described in greater detail in U.S. Patent Application Publication No. 2014/0161459, which is fully incorporated herein by reference. The coaxial TOSA 220 with the optical fiber coupling receptacle and laser package may also be used in an optical transmitter without a ROSA.

Figure 4:
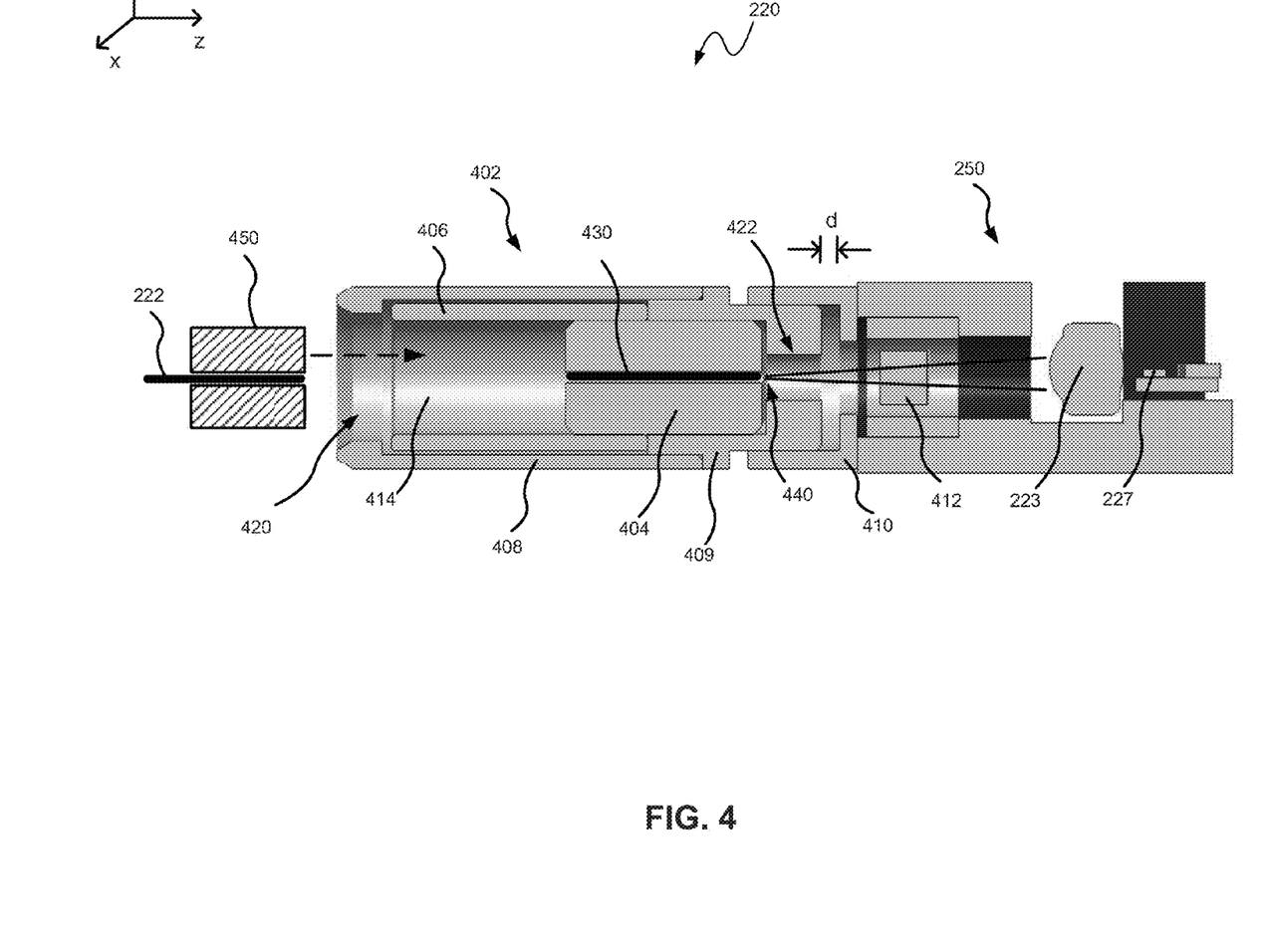
FIG. 4 is a cross-sectional view of an embodiment of the coaxial TOSA with optical fiber coupling receptacle for use in the optical transceiver modules shown in FIGS. 2, 3A, and 3B.

Referring now to FIG. 4, a coaxial TOSA 220 includes an optical fiber coupling receptacle 402 extending from an optical coupling end of the laser package 250. The optical fiber coupling receptacle is configured to allow efficient connection of an optical fiber 222 to the TOSA 220. The laser package 250, as described previously, includes a laser or laser diode 227 to generate a laser signal and a lens 223 to focus laser light to a focal point 440. In some embodiments, additional optical components, such as an optical isolator 412 to reduce back reflection towards the laser diode, may be employed in the path of the laser light.

The optical fiber coupling receptacle 402 is configured to receive a fiber-terminating ferrule 450 at the end of the optical fiber 222 for coupling to the laser package 250, through an intermediate optical fiber segment 430 held in a fiber-coupling ferrule 404. The receptacle 402 includes a housing, which may be formed by one or more housing components 408, 409 configured to provide an outer shell or structure for the receptacle 402. The receptacle may be cylindrically shaped with a longitudinal axis in the z-direction as shown. The housing components may be arranged in any suitable manner to accomplish this purpose, with one embodiment illustrated in FIG. 4. In this embodiment, a z-ring 410 is configured to allow for connection, alignment and fastening of the receptacle 402 to the laser package 250, as will be described in greater detail below.

The fiber-coupling ferrule 404 holds a relatively short optical fiber segment 430 that extends substantially over the length of the fiber-coupling ferrule 404. The fiber-coupling ferrule 404 is a cylindrically shaped component that may be clamped or otherwise fastened onto the optical fiber segment 430. In some embodiments, the fiber-coupling ferrule 404 may be fabricated from a ceramic material. In the embodiment shown in FIG. 4, the fiber-coupling ferrule 404 is fastened to the interior of housing component 409 by a press fit (friction fit) insertion or other suitable technique.

The optical fiber coupling receptacle 402 may further include an inner sleeve 406 configured to provide a cavity 414 that receives the fiber-terminating ferrule 450 through a first open end 420. The optical fiber 222 in the fiber-terminating ferrule 450 is configured to mate or couple with the shorter fiber optic segment 430 in fiber-coupling ferrule 404, as will be explained in greater detail below. Fiber-terminating ferrule 450 may also be a cylindrically shaped ceramic component that is be clamped or otherwise fastened onto the end of optical fiber 222. The fiber-terminating ferrule 450 may be shaped to allow insertion and fitting into the cavity 414 of sleeve 406. The fiber-terminating ferrule 450 may be secured in the cavity 414 using epoxy or other suitable mechanism after insertion. A second open end 422 of the receptacle 402 allows laser light to reach the laser coupling end of the optical fiber segment 430 in the ferrule 404, for example at the focal point 440 of the light.

In some embodiments, the optical fiber coupling receptacle 402 may be assembled by inserting one end of the fiber-coupling ferrule 404 into a first housing component 409 and sliding the sleeve 406 onto the end of the fiber-coupling ferrule 404 that protrudes from the first housing component 409. A second housing component 408 may then be slid over the sleeve 406 and attached to the exterior of the first housing component 409 by a press fit. Other assembly methods and means for attachment may also be used.

The optical fiber coupling receptacle 402 may then be inserted into the z-ring 410 and secured with a press fit. The insertion may result in a selected offset distance, d, along the z-axis, such that the laser coupling end of the optical fiber segment 430 is aligned with the focal point 440 of the laser light along the z-axis to achieve a desired power transmission of the laser signal and a desired level of signal transmission quality. Additionally, as part of the assembly process, the z-ring 410 may be welded to the laser package 250 at a position in the x-y plane such that the laser coupling end of the optical fiber 430 is aligned with the focal point 440 in the x-y plane to achieve the desired power transmission. The x,y,z coordinates of the alignment location associated with the focal point 440 of the laser may be determined by a power measurement of a test signal generated by the laser prior to assembly of the receptacle and z-ring to the laser package 250.

Figure 5:
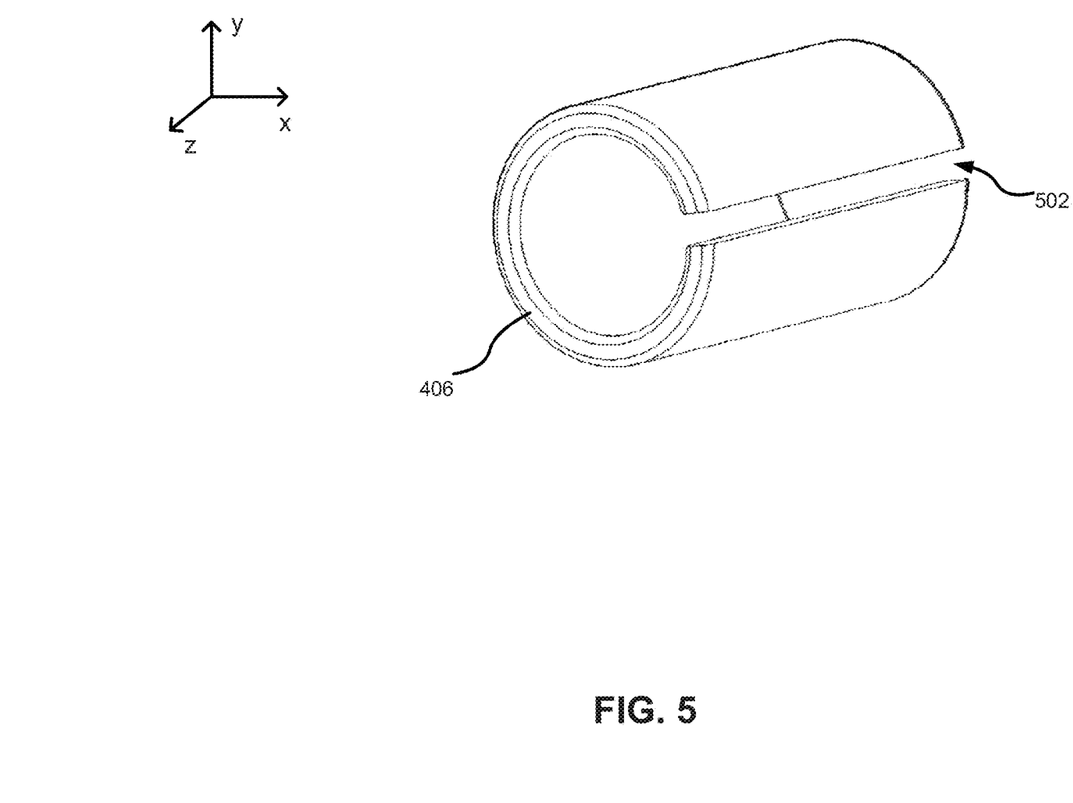
FIG. 5 is a perspective view of a sleeve component of the optical fiber coupling receptacle shown in FIG. 4.

The housing components 408 and 409, as well as the z-ring 410, may be fabricated to provide relatively high strength and rigidity sufficient to maintain alignment of the fiber-terminating ferrule 450 to the fiber-coupling ferrule 404 (after insertion) and of the fiber-coupling ferrule 404 to the focal point 440. The sleeve 406 may be fabricated with sufficient flexibility to allow insertion of the fiber-terminating ferrule 450 without requiring a level of insertion force that could force or otherwise cause misalignment during insertion. In some embodiments, for example as shown in FIG. 5, the sleeve 406 may be configured as a "C" shaped split sleeve with a slot or channel 502 running the length of the sleeve along the z-axis. The slot allows for some flexibility and freedom of movement of the sleeve during insertion of fiber-terminating ferrule 450. The ferrules 404, 450, and receptacle components including sleeve 406 are manufactured with a level of precision, or manufacturing tolerance, sufficient to ensure that alignment of the optical fiber 222, the optical fiber segment 430 and the focal point 440 of the laser light are within parameters to achieve a desired level of signal transmission quality. The ferrules, housing components and sleeve may be fabricated, such that assembly of all components results in a concentric alignment (along the z-axis), of the optical fiber 222 and optical fiber segment 430, after insertion of the fiber-terminating ferrule 450 into the cavity 414 of the receptacle 402. In some embodiments, the concentric alignment may achieve a tolerance on the order of 0.5 microns or less.

Figure 6:
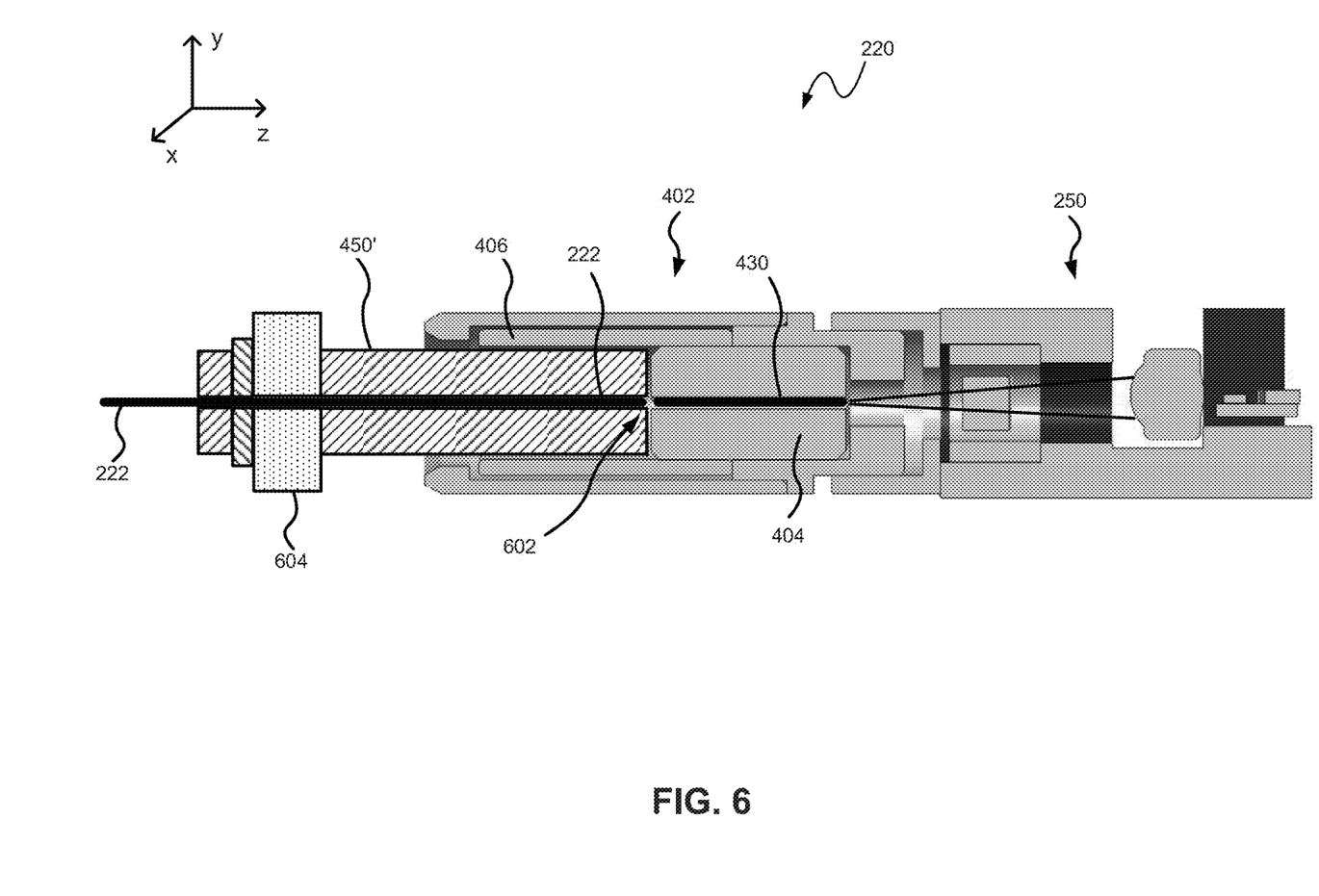
FIG. 6 is a cross-sectional view of the coaxial TOSA with optical fiber coupling receptacle receiving another embodiment of a ferrule-terminated optical fiber.

FIG. 6 illustrates another embodiment of a fiber-terminating ferrule 450' inserted in the optical fiber coupling receptacle 402 and positioned or seated against the fiber-coupling ferrule 404. In this embodiment, the fiber-terminating ferrule 450 includes a gripping knob 604 to aid in the process of inserting the fiber-terminating ferrule 450 until the optical fiber 222 is optically coupled with the optical fiber segment 430. The fiber-terminating ferrule 450 may also provide mechanical protection to the fiber 222 during insertion. The fiber-terminating ferrule 450 is shown to mate or couple with the fiber-coupling ferrule 404, after insertion, at a coupling point 602 such that the laser light may be efficiently coupled from fiber optic segment 430 to optical fiber 222, as described previously. In some embodiments, the fiber-terminating ferrule 450 may be configured to provide an industry standard connection of any suitable type for optical fiber 222, such as, for example an LC (Lucent Connector) type connection.

Figure 7:
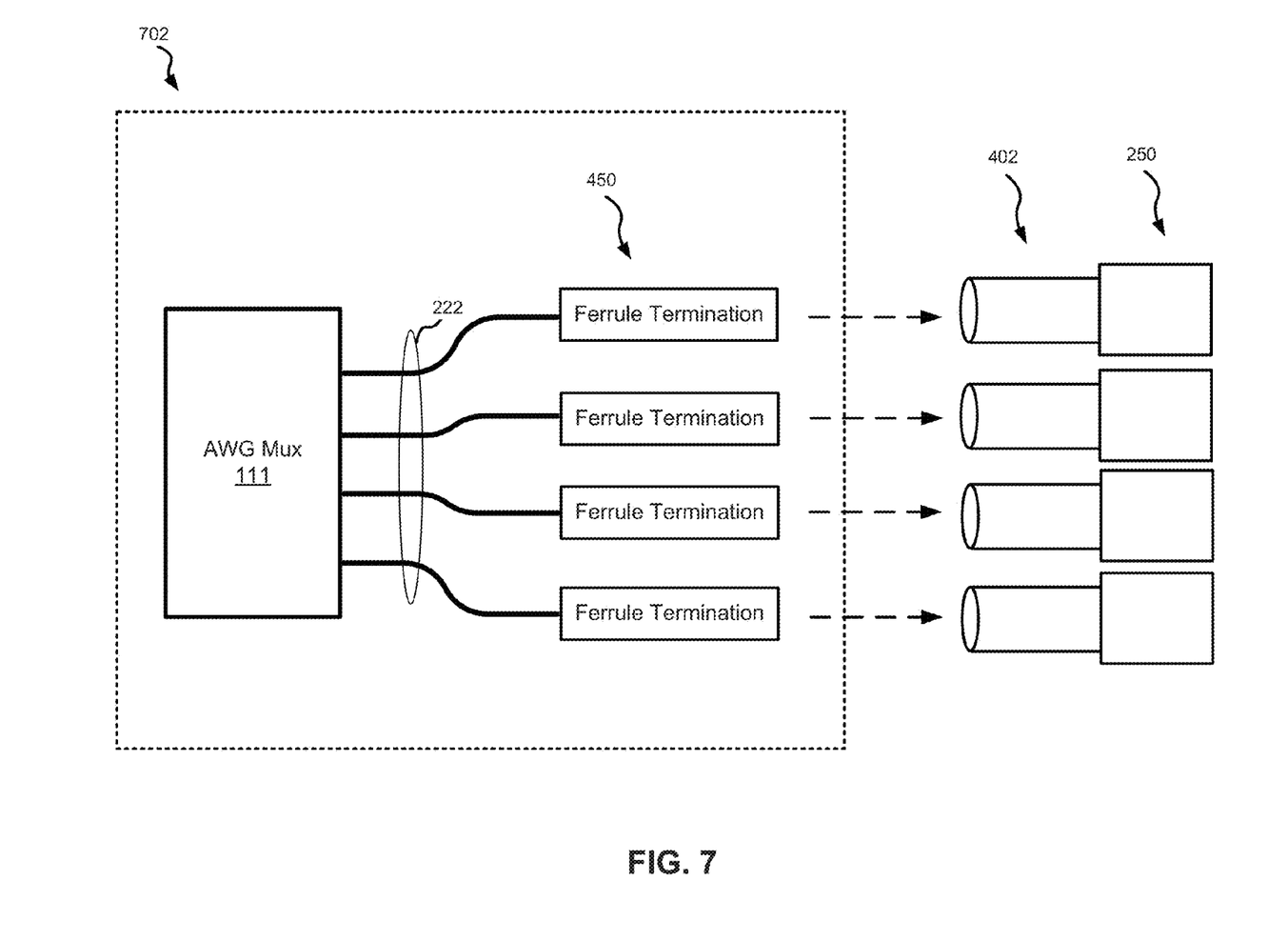
FIG. 7 is an illustration of an assembly of optical fibers to receptacles consistent with an embodiment of the present disclosure.

The optical fiber coupling receptacle 402 advantageously provides a relatively efficient method for coupling the optical fiber 222 to the coaxial TOSA 220 as part of the assembly process for an optical transceiver. This may be particularly important in embodiments of optical transceiver modules that include multiple TOSAs and where each TOSA would require bonding of one end of an optical fiber to a laser package associated with that TOSA. FIG. 7 illustrates an example of an assembly process consistent with an embodiment of the present disclosure. In this example, four optical fibers 222 are coupled (e.g., bonded) to an AWG Mux 111, with each optical fiber terminated, at the opposite end, in a fiber-terminating ferrule 450. This grouping of components may comprise a mux-fiber assembly 702 which may be manufactured separately, perhaps by one or more different vendors. During a later stage of the transceiver module fabrication process, the mux-fiber assembly 702 may be introduced and each fiber-terminating ferrule 450 inserted into the matching receptacle 402 of one of the coaxial TOSAs 220 rather than being directly bonded to the TOSA laser. The use of an optical fiber coupling receptacle in this manner thus permits increased flexibility in the manufacturing process and may reduce cost and increase reliability. Additionally, in the event of a failure of one of the TOSA lasers, for example during testing, the optical fiber coupling receptacle 402 allows for the removal of the ferrule terminated fiber from the failed TOSA and re-insertion into a new replacement TOSA. Thus, only the failed TOSA would need to be replaced rather than the entire mux-fiber assembly 702, which may result in increased production yield.

Figure 8:
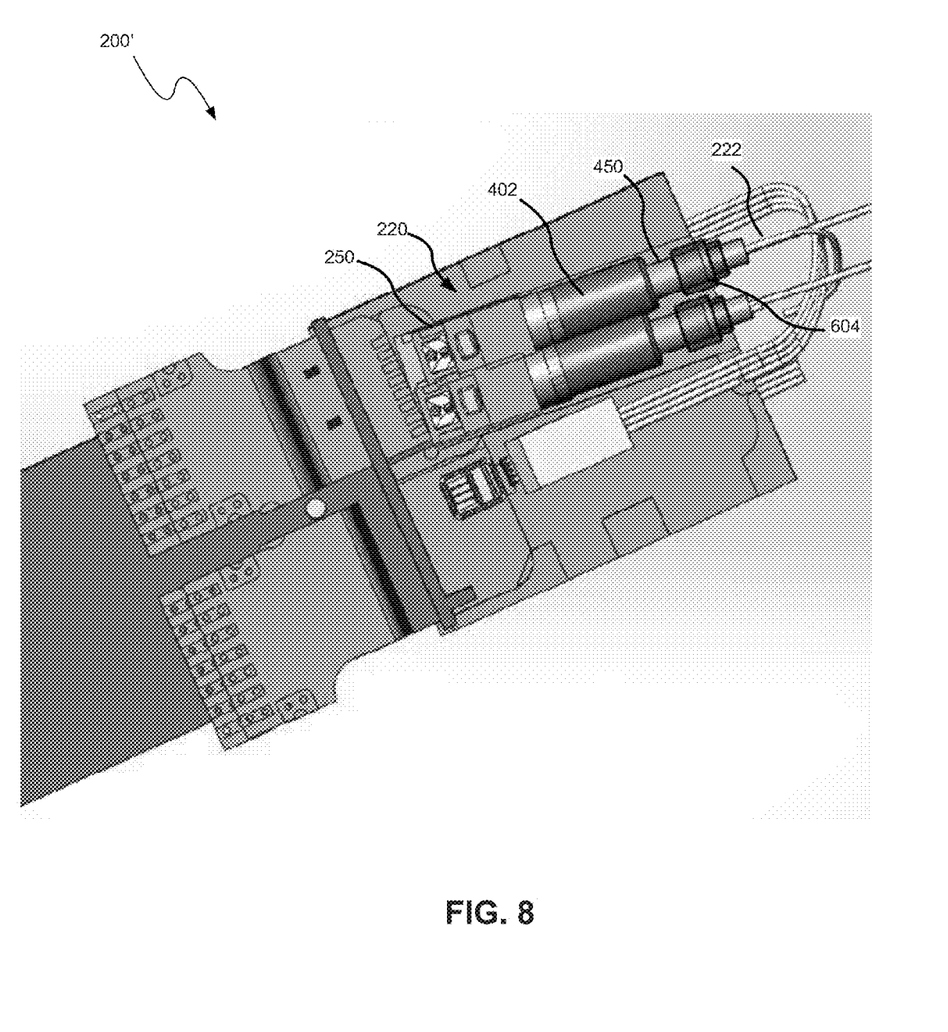
FIG. 8 is a top view of another embodiment of an optical transceiver module including coaxial TOSAs with optical fiber coupling receptacles shown in FIG. 6.

FIG. 8 is a top view of another embodiment of an optical transceiver module 200' including coaxial TOSAs 220 with optical fiber coupling receptacles 402 receiving fiber-terminated ferrules 450 as shown in FIG. 6. The coaxial TOSAs 220 include the optical fiber coupling receptacles 402 extending from laser packages 250, as described above. The fiber-terminating ferrule 450 is inserted into the optical fiber coupling receptacle 402 with optical fiber 222 extending outward to be connected to an AWG Mux (not shown). The optical fiber coupling receptacles 402 may be gripped at the gripping knobs 604 for connecting and disconnecting.

Accordingly, a coaxial TOSA includes an optical fiber coupling receptacle, consistent with embodiments described herein, to allow for insertion of a ferrule-terminated optical fiber into the receptacle and thus to facilitate coupling of optical fibers to multiple coaxial TOSAs in a multi-channel optical transceiver.

Consistent with an embodiment, a coaxial transmitter optical subassembly (TOSA) includes a laser package having an optical coupling end and an electrical connecting end opposite the optical coupling end. The laser package includes a laser submount including conductive paths proximate the electrical connecting end for providing electrical connections, and a laser diode mounted on the laser submount and electrically connected to the conductive paths. The coaxial TOSA further includes an optical fiber coupling receptacle extending from the laser package. The optical fiber coupling receptacle includes a housing having a first open end to receive a fiber-terminating ferrule at one end of an optical fiber and a fiber-coupling ferrule holding an optical fiber segment. The fiber-coupling ferrule being secured within the housing to optically couple the optical fiber segment to a laser of the TOSA through a second open end of the housing opposite the first open end. A sleeve is disposed on an interior surface of the housing to provide a cavity to secure the fiber-terminating ferrule and align the optical fiber to the optical fiber segment.

Consistent with another embodiment, an optical transceiver module includes a transceiver housing, a plurality of coaxial transmitter optical subassemblies (TOSAs) located in the transceiver housing for transmitting optical signals at different channel wavelengths, and a multi-channel receiver optical subassembly (ROSA) located in the transceiver housing for receiving optical signals at different channel wavelengths. Each of the coaxial TOSAs include a laser package having an optical coupling end and an electrical connecting end opposite the optical coupling end. The laser package includes a laser submount including conductive paths proximate the electrical connecting end for providing electrical connections, and a laser diode mounted on the laser submount and electrically connected to the conductive paths. The coaxial TOSA further includes an optical fiber coupling receptacle extending from the laser package. The optical fiber coupling receptacle includes a housing having a first open end to receive a fiber-terminating ferrule at one end of an optical fiber and a fiber-coupling ferrule holding an optical fiber segment. The fiber-coupling ferrule being secured within the housing to optically couple the optical fiber segment to a laser of the TOSA through a second open end of the housing opposite the first open end. A sleeve is disposed on an interior surface of the housing to provide a cavity to secure the fiber-terminating ferrule and align the optical fiber to the optical fiber segment.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A coaxial transmitter optical subassembly (TOSA) comprising:
    a laser package having an optical coupling end and an electrical connecting end opposite said optical coupling end, said laser package further comprising a laser submount including conductive paths proximate said electrical connecting end for providing electrical connections, and a laser diode mounted on said laser submount and electrically connected to said conductive paths;
    an optical fiber coupling receptacle extending from the laser package, the optical fiber coupling receptacle comprising:
        a housing having a first open end to receive a fiber-terminating ferrule at one end of an optical fiber;
        a fiber-coupling ferrule holding an optical fiber segment, said fiber-coupling ferrule being secured within said housing to optically couple said optical fiber segment to a laser of said TOSA through a second open end of said housing opposite said first open end; and
        a sleeve disposed on an interior surface of said housing to provide a sleeve cavity to secure said fiber-terminating ferrule and align said optical fiber to said optical fiber segment; and
    a z-ring coupled to said laser package, said z-ring defining a z-ring cavity, said z-ring cavity receiving at least a portion of said housing.

2. The coaxial TOSA of claim 1, wherein said housing and said sleeve are configured to provide concentric alignment of said optical fiber and said optical fiber segment to within a tolerance of 0.5 microns or less.

3. The coaxial TOSA of claim 1, wherein said second open end provides an aperture through which light from said laser diode is focused at a focal point coincident with said optical fiber segment.

4. The coaxial TOSA of claim 1, wherein an inner diameter of said sleeve is selected to match an outer diameter of said fiber-terminating ferrule, such that said fiber-terminating ferrule may be inserted and secured in said sleeve cavity.

5. The coaxial TOSA of claim 1, wherein said sleeve is a split sleeve comprising a slot along the longitudinal axis of said sleeve configured to allow flexibility during insertion of said fiber-terminating ferrule in said sleeve cavity.

6. The coaxial TOSA of claim 1, wherein an end of said optical fiber opposite said ferrule-terminated end is bonded to an arrayed waveguide grating multiplexer.

7. The coaxial TOSA of claim 3, wherein said laser package further comprises optics mounted proximate to said optical coupling end, said optics including a lens to focus said light from said laser diode to said focal point.

8. The coaxial TOSA of claim 7, wherein said optics further include an optical isolator.

9. The coaxial TOSA of claim 1, wherein the laser package is a cuboid type TO laser package having a plurality of substantially flat outer surfaces.

10. An optical transceiver module comprising:
a transceiver housing;
a plurality of coaxial transmitter optical subassemblies (TOSAs) located in said transceiver housing for transmitting optical signals at different channel wavelengths, each of said plurality of coaxial TOSAs comprising:
  a laser package having an optical coupling end and an electrical connecting end opposite said optical coupling end, said laser package further comprising a laser submount including conductive paths proximate said electrical connecting end for providing electrical connections, and a laser diode mounted on said laser submount and electrically connected to said conductive paths; and
  an optical fiber coupling receptacle extending from the laser package, the optical fiber coupling receptacle comprising:
    a housing having a first open end to receive a fiber-terminating ferrule at one end of an optical fiber;
    a fiber-coupling ferrule holding an optical fiber segment, said fiber-coupling ferrule being secured within said housing to optically couple said optical fiber segment to a laser of said TOSA through a second open end of said housing opposite said first open end; and
    a sleeve disposed on an interior surface of said housing to provide a sleeve cavity for securing said fiber-terminating ferrule and align said optical fiber to said optical fiber segment; and
  a z-ring coupled to said laser package, said z-ring defining a z-ring cavity, said z-ring cavity receiving at least a portion of said housing; and
a multi-channel receiver optical subassembly (ROSA) located in said transceiver housing for receiving optical signals at different channel wavelengths.

11. The optical transceiver of claim 10, wherein said housing and said sleeve are configured to provide concentric alignment of said optical fiber and said optical fiber segment to within a tolerance of 0.5 microns or less.

12. The optical transceiver of claim 10, wherein said second open end provides an aperture through which light from said laser diode is focused at a focal point coincident with said optical fiber segment.

13. The optical transceiver of claim 10, wherein an inner diameter of said sleeve is selected to match an outer diameter of said fiber-terminating ferrule, such that said fiber-terminating ferrule may be inserted and secured in said sleeve cavity.

14. The optical transceiver of claim 10, wherein said sleeve is a split sleeve comprising a slot along the longitudinal axis of said sleeve configured to allow flexibility during insertion of said fiber-terminating ferrule in said sleeve cavity.

15. The optical transceiver of claim 10, wherein an end of said optical fiber opposite said ferrule-terminated end is bonded to an arrayed waveguide grating multiplexer.

16. The optical transceiver of claim 12, wherein said laser package further comprises optics mounted proximate to said optical coupling end, said optics including a lens to focus said light from said laser diode to said focal point.

17. The optical transceiver of claim 10 further comprising a transmit connecting circuit electrically connected to said coaxial TOSAs and a receive connecting circuit electrically connected to said ROSA.

18. The optical transceiver of claim 10 further comprising a mux-fiber assembly including an optical multiplexer coupled to a plurality of ferrule-terminated optical fibers, each of said ferrule-terminated optical fibers including a fiber-terminating ferrule at one end for insertion into a respective one of the optical fiber receptacles, and wherein the multiplexer is configured to multiplex said transmitted optical signals into a transmitted multiplexed optical signal.

19. The optical transceiver of claim 18 further comprising an optical demultiplexer coupled to said ROSA for demultiplexing a received multiplexed optical signal into said received optical signals.

20. The optical transceiver of claim 10 wherein said plurality of coaxial TOSAs comprises four coaxial TOSAs configured to transmit at four different channel wavelengths at transmission rates of at least about 10 Gbps per channel and transmission distances of 2 km to at least about 10 km.

* * * * *